United States Patent [19]
Rennie

[11] Patent Number: 4,986,139
[45] Date of Patent: Jan. 22, 1991

[54] GYROSCOPE CONTROL SYSTEMS

[75] Inventor: Nigel F. Rennie, Bracknell, England

[73] Assignee: British Aerospace plc, Berks, England

[21] Appl. No.: 402,191

[22] Filed: Sep. 5, 1989

[30] Foreign Application Priority Data

Sep. 12, 1988 [GB] United Kingdom ............... 8821370

[51] Int. Cl.$^5$ .......................................... G01C 19/28
[52] U.S. Cl. ........................................ 74/5.4; 74/5.6 E
[58] Field of Search ............... 74/5.4, 5.6 E, 5.46, 74/5 R

[56] References Cited

U.S. PATENT DOCUMENTS 4,189,947  2/1980  Friedland ...................... 74/5.4 X
4,651,576  3/1987  Luke ............................... 74/5.46

Primary Examiner—Rodney H. Bonck
Attorney, Agent, or Firm—Nixon & Vanderhye

[57] ABSTRACT

A gyroscope system includes a gyroscope (1), angle pick-offs (5) and a control circuit (6,7). The angle pick-offs (5) sense the tilt of the gyroscope's rotor and generate a signal which is received by the control circuit (6,7). The control circuit generates a control signal which causes a torque to be applied to the rotor. The control circuit includes both a primary integrator (6) which integrates the signal from the angle pick-offs (5) and a secondary integrator (7) which integrates the signals output by the primary integrator (6).

In one example an independent angular accelerometer provides a further input to the secondary integrator (7).

5 Claims, 3 Drawing Sheets

TO TORQUE COILS

TO TORQUE COILS

GYROSCOPE CONTROL SYSTEMS

BACKGROUND OF THE INVENTION

The present invention relates to gyroscope systems such as those used for the control and navigation of aircraft and missiles.

A commonly used form of gyroscope system has a null-seeking servo with a type II control loop which is designed to be unconditionally stable. This arrangement allows the gyroscope to be operated in a "strap-down" mode, without needing gimbals to suspend it. The suspension of the gyroscope's rotor allows the rotor to move freely over a limited range of angles. The control loop then detects the angle of tilt of the rotor with respect to its null position and generates a torque to precess the rotor back into position. Since the tilt is generated by the angular motion of the gyroscope's case the torque required to keep the rotor at its null position is a measure of that applied angular motion.

Such a type II gyroscope system comprises a gyroscope, angle pick-offs arranged to sense the tilt angles of the gyroscope's rotor, control means arranged to receive a signal generated by the angle pick-offs and to generate a control signal and torque applying means arranged to apply a torque to the gyroscope's rotor in response to the control signal. The control means include a primary integrator arranged to integrate the signal received from the angle pick-offs to generate the control signal.

The defining characteristic of such a type II system is that it subjects the control signal to two stages of integration. The first integrator is implemented in the primary integrator of the control means and integrates the signal from the angle pick-offs to generate the control signal which is applied to the torque applying means. Typically the torque applying means are electromagnetic coils positioned towards the perimeter of the gyroscope's rotor. The other integrator is the gyroscope itself. The dynamics of the gyroscope are such that its output angle is proportional to the integral of the torque applied to the orthogonal axis.

A type II control loop is the highest order control system that can be designed to be unconditionally stable. If the control signal is subject to a further integrating stage giving a third order system then the loop cannot be designed to be unconditionally stable and the resulting system may, for example, be subject to unbounded oscillations upon start-up.

SUMMARY OF THE INVENTION

According to the present invention such a gyroscope system further comprises a secondary integrator arranged to receive a signal generated by the primary integrator and to generate the control signal for the torque applying means.

For the reasons noted above it has not in general been thought possible to include a third integrator in the control loop without resulting in a system which is subject to instability. However a third integrator can be included if its frequency response is tailored so that it is effective as an integrator only at low frequencies and at other frequencies passes the input signal in a linear fashion. Such a system retains its type II characteristics because of the frequency-dependent nature of the performance of the gyroscope.

The gyroscope's rotor is not a true integrator at very low frequencies. This results from a phenomenon known as autoerection. Small deflections of the gyroscope from its null position tend to be opposed by small parasitic torques generated primarily by gas pumping: although the housing for the gyroscope is evacuated the vacuum is inevitably imperfect. As a result of these phenomena at very low frequencies the gyroscope ceases to act as an integrator for the applied torque and so, in the absence of any additional integrator, the control system effectively degrades to a type I system. The inclusion in the control means of a secondary integrator which operates at these low frequencies therefore improves the performance of the system whilst maintaining the unconditional stability characteristic of a type II system.

Preferably the gyroscope system further includes angular acceleration sensing means independent of the gyroscope arranged to output a signal to the secondary integrator to modify in accordance with the sensed angular acceleration the control signal supplied to the torque applying means.

The use of an independent angular acceleration sensor to enhance the performance of the gyroscope system is described and claimed in detail in the applicant's co-pending European application No. 89301289.8. The signal from the angular accelerometer has to be integrated to provide the velocity dependent signal for the torque applying means. In the known type II systems with only a single primary integrator the signal from the angular accelerometer is necessarily fed into the control system before the primary integrator. Although this is effective to give the required velocity dependent signal for the torque coils this arrangement has the disadvantage that any low frequency errors in the signal from the accelerometer produce an offset which shifts the null position of the wheel. This results in a deterioration of the performance of the gyroscope system when a change in the parasitic torque acting on the gyroscope's rotor occurs.

The gyroscope system is calibrated to correct for the parasitic torque at the original null position. If the position of the null shifts then the change in the parasitic torque introduces systematic error. Moreover in extreme cases if the offset is large the null can be moved close to the mechanical stops of the wheel or even beyond them. In this case the loop cannot control the wheel and so the system fails catastrophically. By providing a secondary integrator in the control means the present invention enables the signal from the angular accelerometer to be applied after the primary integrator. Any low frequency error in the accelerometer signal is therefore cancelled by the primary servo loop and so does not appear as an offset in the null position.

Preferably the secondary integrator has a first input arranged to receive the signals from the primary integrator and a second input arranged to receive signals from the angular accelerometer, the secondary integrator being arranged to integrate signals received from the first input at low frequencies only and to integrate signals from the second input across the full bandwidth of the system.

Using, for example, a suitably configured analogue filter it is possible to construct the secondary integrator as a summing junction which has a different frequency response for its two inputs. The enhancement signal from the angular accelerometer then sees the junction as a true integrator, while the control signal sees it as an integrator at very low frequencies only.

BRIEF DESCRIPTION OF THE DRAWINGS

A device in accordance with the present invention is now described in detail with reference to the accompanying drawings, in which.

DESCRIPTION OF A PREFERRED EXAMPLE

Figure 1:
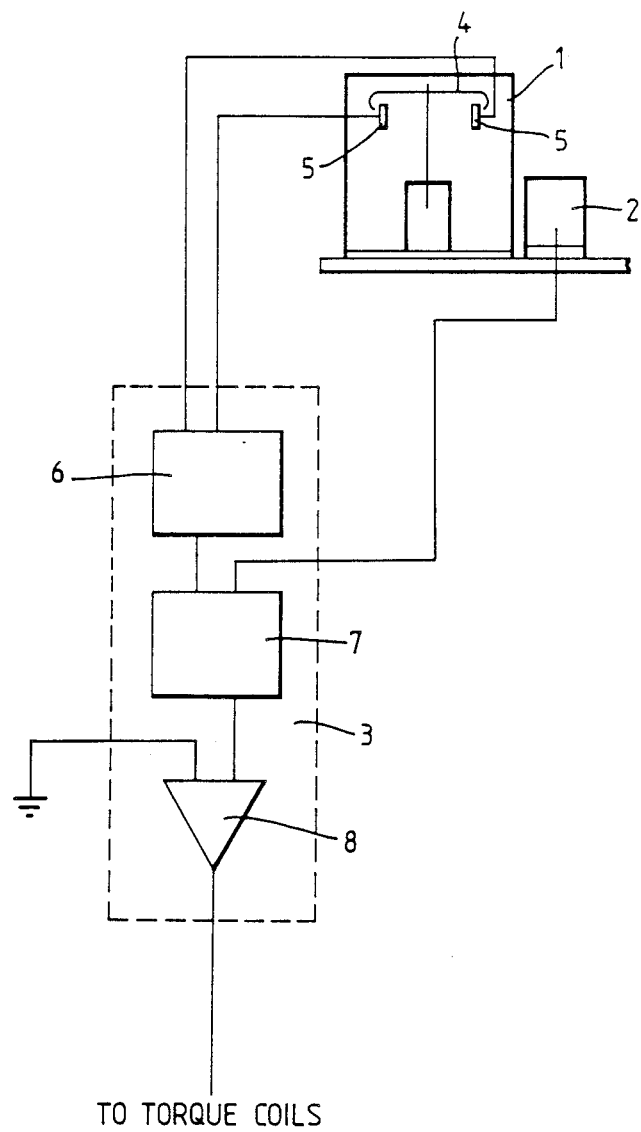
FIG. 1 is a diagram illustrating the present invention.

A gyroscope system comprises a dual axis rate gyroscope 1, an independent angular accelerometer 2 and a control system 3.

The gyroscope 1 is a dual axis rate gyroscope of the type disclosed and claimed in the applicant's earlier British Pat. No. 2079954. The gyroscope 1 includes a rotor 4 and pick-off coils 5. Magnetic elements towards the periphery of the rotor 4 induce currents in the pick-off coils 5 producing a signal dependent on the angle of tilt of the rotor 4. Signals from the pick-off coils 5 are input to the control system 3.

The control system 3 includes a primary integrator 6 and a secondary integrator 7. The secondary integrator 7 has two inputs. One of these inputs receives the signal from the primary integrator 6 and the other input receives the signal from the angular accelerometer 2. The secondary integrator 7 is constructed as a summing junction with a different frequency response for each of its two inputs. The input receiving the signal from the angular accelormeter 2 sees the secondary integrator 7 as a true integrator, that is an integrator which is effective over a wide bandwidth. At the other input the signal from the primary integrator 6 sees the integrator 7 as an integrator at very low frequencies only.

The output from the secondary integrator 7 is fed to an amplifier 8 which drives torque coils 5 positioned at the perimeter of the rotor 4. The signal from the secondary integrator 7 may also be applied to an output device (not shown) to indicate the sensed angular motion of the gyroscope case.

The frequency response of the secondary integrator 7 is chosen to be complementary to the frequency response of the gyroscope 1. At high frequencies the primary integrator 6 integrates a signal from the pick-off coils 5 and outputs this to the secondary integrator 7. Since the frequency of the signal is outside the range of operation of the secondary integrator 7 the signal is passed straight through to the amplifier 8 without further integrations. This signal is then applied via the torque coils 5 to the rotor 4. The dynamics of the rotor 4 are such that in response to the torque applied by the torque coils 5 it moves through an angle which depends upon the integral of the applied torque. At such a high frequency therefore the rotor 4 provides the second integrating stage of the control system so that the system as a whole is of type II.

At low frequencies the rotor 4 ceases to act as an integrator. Small movements of the rotor 4 at low frequencies away from its null position results in gas pumping, a fluid-dynamic effect which generates parasitic torques which act on the rotor 4 in such a direction that it is driven back towards its null position. The response of the rotor 4 to the applied torque is therefore substantially linear at very low frequencies. The signal from the pick-off coils 5 is still subject to a first integration step at the primary integrator 6. The signal from the integrator 6 is then subject to a further integration at the secondary integrator 7 which comes into effect in this particular frequency domain. Thus although the rotor 4 ceases to act as an integrator the system as a whole maintains its type II characteristics.

Figure 3:
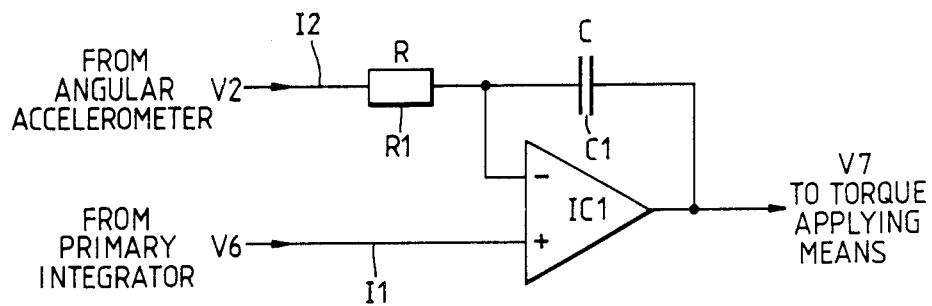
FIG. 3 is a diagram showing a first example of a secondary integrator.

The signal from the angular accelerometer 2 is applied to the other input of the secondary integrator 7. In the preferred example the secondary integrator 7 is constructed so that the signal from the angular accelerometer 2 sees it as a true integrator throughout the frequency range in which the system operates. As seen in FIG. 3 the secondary integrator includes a differential input operational amplifier IC1. A resistor R1 and capacitor C1 are provided to tailor the frequency response at the input of IC1 receiving the signal from the angular accelerometer. The transfer function is $$\frac{V7}{V6} = \frac{s + \Delta}{s}, \quad \frac{V7}{V_2} = \frac{-\Delta}{s}, \quad \Delta = \frac{1}{RC}$$

This circuit inverts the sense of $V_2$ which requires an additional inversion in $F(s)$.

Figure 4:
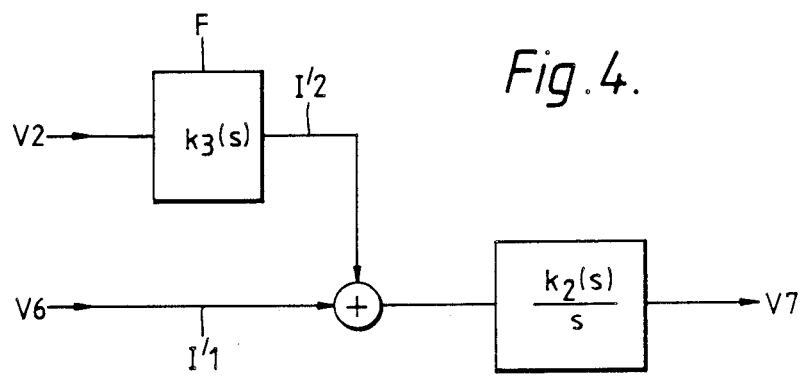
FIG. 4 is a diagram showing an alternative example of a secondary.

Alternatively a simpler construction may be used in which the secondary integrator integrates the enhancement signal from the angular accelerometer 2 only within the same narrow frequency range as it integrates the signal from the primary integrator 6. In this case, as shown in FIG. 4, another filter is need to precondition the enhancement signal before it is summed into the gyroscope control loop at the secondary integrator. This preconditioning filter must be closely matched to the secondary integrator to avoid gain and phase anomalies in the transfer function for example by using digital filters. The transfer function is given by $$\frac{V7}{V6} = \frac{K_2(s)}{s}, \quad \frac{V7}{V_2} = \frac{K_2(s) * K_3(s)}{s}$$

To obtain a similar response to the preferred realization set:

$$K_2(s) = S + \Delta, \quad K_3(s) = \frac{-\Delta'}{s + \Delta'}$$

$$\text{Then } \frac{V7}{V6} = \frac{s + \Delta}{s}, \quad \frac{V7}{V_2} = \frac{-\Delta' * (s + \Delta)}{s * (s + \Delta')}$$

If $\Delta$ is approximately equal to $\Delta'$ then $$\frac{V7}{V_2} = \frac{-\Delta}{s}$$

Figure 5:
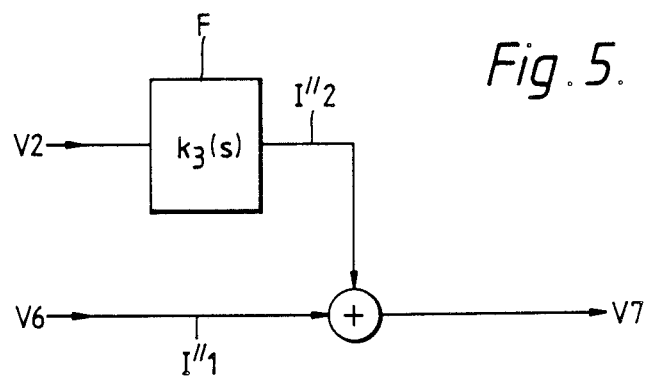
FIG. 5 a further alternative example of a secondary integrator.

Another alternative is to omit the low frequency integrator function from the system above leaving the preconditioning filter and a simple summing junction as shown in FIG. 5. In this case the preconditioning filter is seen by the enhancement signal as an integrator at high frequencies and linear at low frequencies. The transfer function in this case is given by $$\frac{V7}{V6} = 1, \quad \frac{V7}{V_2} = K_3(s)$$

-continued
$$K_3(s) = \frac{-\Delta}{s + \Delta}$$

The filter characteristic is matched to the autoerection effect of the gyroscope to obtain a composite system which will have reasonable angular acceleration following capability but degraded accuracy compared with the preferred system. At low frequencies the autoerection effect will save the rotor from hitting its stops while at high frequencies the enhancement signal will perform this function.

The use of an enhancement signal from the angular accelerometer 2 improves the high-frequency response of the system and removes contraints on the design of the primary control loop in the manner described in the co-pending application cited above.

Figure 2:
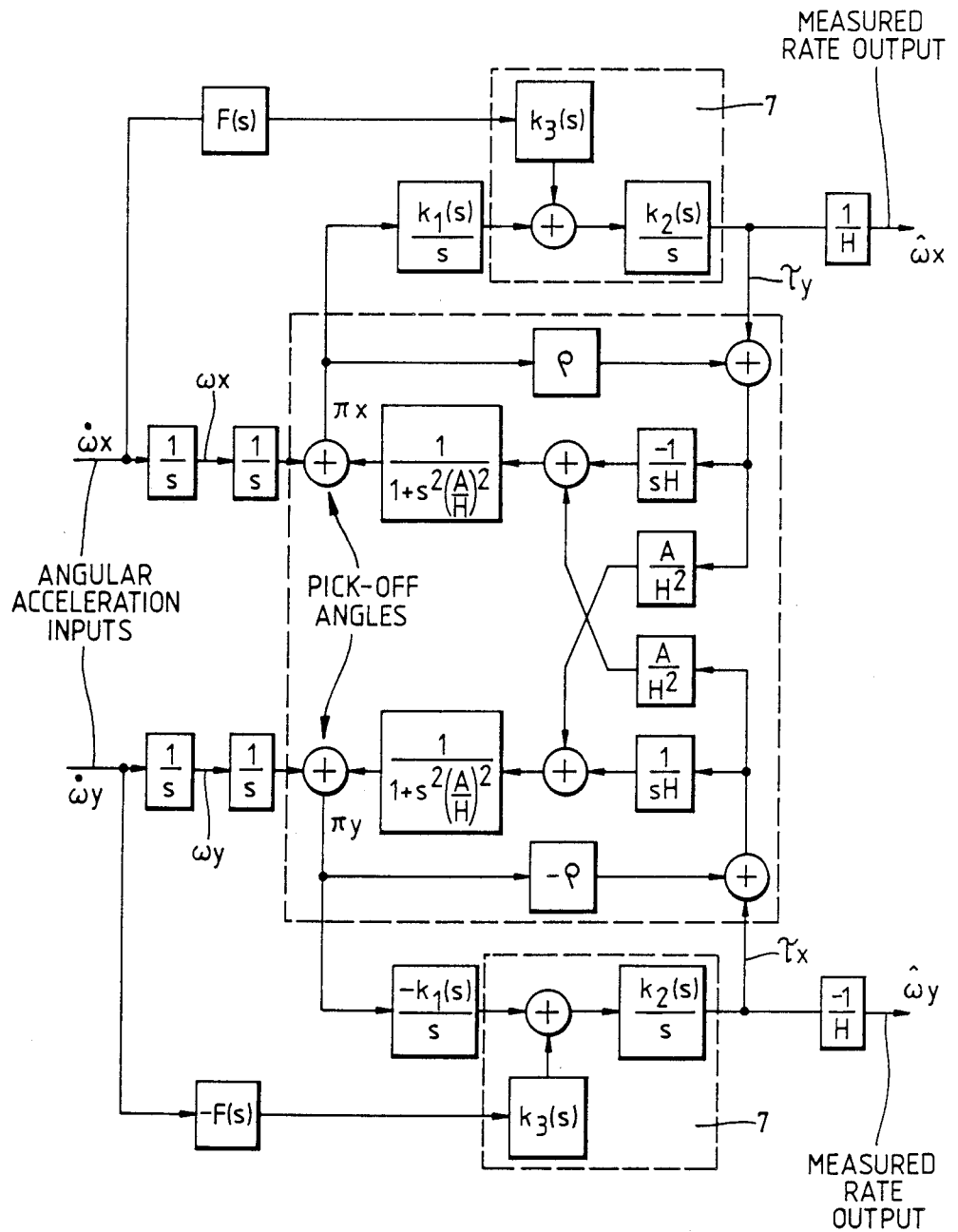
FIG. 2 is a block diagram showing the simplified dynamics of the gyroscope system using Laplacian notation.

FIG. 2 illustrates the dynamics of the gyroscope 1 and its control system using Laplacian notation in which:

s = Laplace operator
A = moment of inertia of rotor about diagonal
H = angular momentum of rotor
ρ = autoerection coefficient of rotor
$\tau_x, \tau_y$ = torques applied to the rotor about its x and y axes respectively
$\pi_x, \pi_y$ = pick-off angles about the gyroscope's x and y axes respectively
$\omega_x \omega_y$ = input angular acceleration about x and y axes
F(s) = the transfer function of the angular accelerometer and its gain and shaping terms
$K_1(s)/s$ = the transfer function of the primary integrator and other gyroscope loop shaping terms
$K_2(s)/s$ = the transfer function of the secondary integrator $K_2(s)/s$ is arranged to be complementary to the frequency dependency of the autoerection effect for example by setting $K_2(s) = s + \rho/H$ where ρ and H are determined experimentally. It should be noted that other parasitic torques act on the rotor and modify the effect of autoerection on the response of the gyroscope and where greater accuracy is required these effects can be taken into account when designing $K_2(s)$ using the method outlined above as a starting point.

I claim:

1. In a gyroscope system comprising a gyroscope said gyroscope including a rotor, angle pick-off means arranged to sense tilt angles of said rotor, control means operatively connected to said angle pick-off means and arranged to receive a signal generated by said angle pick-off means and to generate a control signal and torque applying means operatively connected to said control means and arranged to torque said rotor in response to said control signal, said control means including a primary integrator arranged to integrate said signal generated by said angle pick-off means thereby generating said control signal, the improvement wherein said control means further comprise secondary integrator means operatively connected to said primary integrator and arranged to receive a signal from said primary integrator thereby generating said control signal for said torque applying means.

2. The system according of claim 1, wherein said system further includes angular acceleration sensing means independent of said gyroscope, operatively connected to said control means and arranged to output a signal to said secondary integrator means thereby modifying in accordance with sensed angular acceleration said control signal for said torque applying means.

3. The system of claim 2, wherein said secondary integrator means has a first input arranged to receive signals from said primary integrator and a second input arranged to receive signals from said angular acceleration sensing means, said secondary integrator means being arranged to integrate signals received from said first input at low frequencies only and to integrate signals from said second input across a full bandwidth of said system.

4. The system of claim 2, wherein said system further includes preconditioning filter means arranged to receive a signal from said angular acceleration sensing means, said secondary integrator means having a first input arranged to receive signals from said primary integrator, and a second input arranged to receive signals from said preconditioning filter, said secondary integrator means being arranged to integrate signals from said first and second inputs at low frequencies only.

5. The system of claim 2, wherein said system further includes preconditioning filter means arranged to receive a signal from said angular acceleration sensing means and said secondary integrator means comprise a summing junction having a first input arranged to receive signals from said primary integrator, and a second input arranged to receive signals from said preconditioning filter means.

* * * * *